(12) United States Patent
Hatori

(10) Patent No.: US 9,214,853 B2
(45) Date of Patent: Dec. 15, 2015

(54) TWO-WIRE TRANSMITTER STARTER CIRCUIT AND TWO-WIRE TRANSMITTER INCLUDING THE SAME

(71) Applicant: YOKOGAWA ELECTRIC CORPORATION, Musashino-shi, Tokyo (JP)

(72) Inventor: Daisuke Hatori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 115 days.

(21) Appl. No.: 14/077,904

(22) Filed: Nov. 12, 2013

(65) Prior Publication Data

US 2014/0132243 A1 May 15, 2014

(30) Foreign Application Priority Data

Nov. 14, 2012 (JP) .................................. 2012-250104

(51) Int. Cl.
| | |
|---|---|
| *H02M 1/36* | (2007.01) |
| *G05F 3/08* | (2006.01) |
| *G08C 19/02* | (2006.01) |
| *G08C 19/00* | (2006.01) |

(52) U.S. Cl.
CPC . *H02M 1/36* (2013.01); *G05F 3/08* (2013.01); *G08C 19/00* (2013.01); *G08C 19/02* (2013.01)

(58) Field of Classification Search
CPC ............ G05F 1/614; G05F 3/18; H02M 1/36; H02M 3/156
USPC ...................... 323/220, 223, 231, 901; 363/49
See application file for complete search history.

(56) References Cited

U.S. PATENT DOCUMENTS

| | | | | |
|---|---|---|---|---|
| 4,967,302 | A * | 10/1990 | Hutcheon | ............... H02H 9/008 307/326 |
| 5,708,574 | A * | 1/1998 | Crompton | ........................ 363/53 |
| 7,161,338 | B2 * | 1/2007 | Jiang et al. | ..................... 323/272 |
| 8,427,849 | B2 * | 4/2013 | Asinovski et al. | .............. 363/49 |
| 8,461,812 | B2 * | 6/2013 | Kim et al. | ..................... 323/225 |
| 2006/0154709 | A1 | 7/2006 | Takamuku | |
| 2012/0014145 | A1 * | 1/2012 | Koike | ............................. 363/49 |
| 2012/0082204 | A1 * | 4/2012 | Iwano | .................... G08C 19/02 375/238 |
| 2012/0105027 | A1 | 5/2012 | Dunipace | |
| 2014/0247023 | A1 * | 9/2014 | Kippley et al. | ............... 323/220 |

FOREIGN PATENT DOCUMENTS

| | | |
|---|---|---|
| EP | 2282248 A1 | 2/2011 |
| JP | 2006-174236 A | 6/2006 |
| WO | 2011158278 A1 | 12/2011 |

* cited by examiner

*Primary Examiner* — Gary L Laxton
(74) *Attorney, Agent, or Firm* — Sughrue Mion, PLLC

(57) ABSTRACT

A two-wire transmitter starter circuit is configured to stably supply power at the time of start-up. The two-wire transmitter starter circuit includes a starter current generation circuit. The starter current generation circuit is connected in parallel with a current conversion unit configured to convert a detection signal of a sensor to a predetermined DC current. The starter current generation circuit includes a first series circuit where a first resistor and a shunt regulator are connected in series, and a second series circuit where a switching element and a second resistor are connected in series. The shunt regulator includes a first control terminal connected to a connection point of the switching element and the second resistor. The switching element includes a second control terminal connected to a connection point of the first resistor and the shunt regulator.

11 Claims, 7 Drawing Sheets

TWO-WIRE TRANSMITTER STARTER CIRCUIT AND TWO-WIRE TRANSMITTER INCLUDING THE SAME

BACKGROUND OF THE INVENTION

1. Field of the Invention

The present invention relates to a two-wire transmitter starter circuit and a two-wire transmitter including the two-wire transmitter starter circuit. More specifically, the present invention relates to a two-wire transmitter starter circuit including a simplified circuit configuration and a two-wire transmitter including the two-wire transmitter starter circuit.

Priority is claimed on Japanese Patent Application No. 2012-250104, filed Nov. 14, 2012, the content of which is incorporated herein by reference.

2. Description of Related Art

Generally, a two-wire transmitter includes a starter circuit to secure supply of power and achieve stability of the transmitter at the time of start-up. FIG. 4 is a circuit diagram illustrating an example of a two-wire transmitter starter circuit of the related art.

In FIG. 4, a two-wire transmitter 10 is connected to two-wire type transmission lines L1 and L2. The two-wire transmitter 10 and the transmission lines L1 and L2 are formed as a smart (smart) or fieldbus (foundation, Profibus). The smart (smart) and fieldbus (foundation, Profibus) mean a standardized transmission system to interconnect each control devices and each field devices.

The two-wire transmitter 10 includes a starter circuit 20, a current conversion unit 30, a power supply unit 40, and an internal circuit 50.

The starter circuit 20 includes an emitter of one transistor Q1 configuring a current mirror connected to the transmission line L1 via a resistor R1, and an emitter of the other transistor Q2 connected to the transmission line L1 via a resistor R2. A collector of the transistor Q1 is connected to a power supply line Vcc having a power supply voltage Vcc. A collector of the transistor Q2 is connected to a connection point of a base of the transistor Q1 and a base of the transistor Q2. A connection point of the base of the transistor Q1, the base of the transistor Q2, and the collector of the transistor Q2 is connected to a common potential COM via a serial circuit of a switch SW and a constant current source I1.

The current conversion unit 30 is configured to convert a detection signal of a sensor, which is not illustrated, to a DC current ranging from 4 to 20 mA, and includes a current source I2 having one terminal connected to the transmission line L1 and the other terminal connected to the power supply line Vcc, a resistor R3 connected in series with the transmission line L2, a voltage measurement unit V configured to measure a voltage applied across the resistor R3, and a current source control unit CTL configured to control the current source I2 so that an output current has a predetermined value based on a voltage measurement result of the voltage measurement unit V.

A serial circuit of a resistor Ra and a resistor Rb is connected between the power supply line Vcc and the common potential COM. A non-inversion input terminal of a comparator CMP is connected to a connection point of the resistor Ra and the resistor Rb, and an inversion input terminal of the comparator CMP is connected to a reference voltage source Vref1. An output signal of the comparator CMP turns the switch SW on or off.

The power supply unit 40 is connected in parallel with the serial circuit of the resistor Ra and the resistor Rb. The power supply unit 40 includes, for example, a Zener diode ZD. An anode of this Zener diode ZD is connected to the common potential COM, and a cathode of the Zener diode ZD is connected to the power supply line Vcc. Further, the power supply unit 40 may include an error amplifier or the like in place of the Zener diode.

The internal circuit 50 includes, a sensor which is not illustrated and is configured to measure a physical amount such as a pressure or a temperature, a microprocessor which is not illustrated and is configured to perform predetermined signal processing on an output signal of the sensor, and the like. This internal circuit 50 is connected in parallel with the power supply unit 40 and is configured to be driven by an output voltage of the power supply unit 40.

Operations of the circuit illustrated in FIG. 4 will be described. An internal power supply voltage of the power supply line Vcc is Vcc as described above, a voltage of the transmission line L2 is Va, a voltage of the transmission line L1 is Vb, a voltage of a connection point of the base of the transistor Q1, the base of the transistor Q2, the collector of the transistor Q2 and the output terminal of the comparator CMP is Ve, and a voltage of a connection point of the resistor Ra, the resistor Rb and the non-inversion input terminal of the comparator CMP is Vn.

Before start-up, the switch SW is on, and the constant current source I1 operates to flow a predetermined current even when the internal power supply voltage Vcc has not yet launched, in other words, a predetermined voltage has not yet been set to the internal power supply voltage Vcc. Accordingly, a non-inversion input voltage Vn of the comparator CMP is pulled down by the resistor Rb, and voltage Vn<voltage Vref1, such that an output of the comparator CMP becomes low and the voltage Ve becomes low.

At the time of start-up, the transistors Q1 and Q2 are both turned on, a collector current Ist of the transistor Q1 flows due to a rise of the voltage Vb. The collector current Ist promotes the rise of the internal power supply voltage Vcc. Further, the resistors R1 and R2 suppress an upper limit of the collector current Ist.

Further, when the internal power supply voltage Vcc becomes a predetermined voltage and the voltage Vn becomes a predetermined voltage (voltage Vn>voltage Vref1), the output of the comparator CMP becomes high, the voltage Ve becomes high, and the transistors Q1 and Q2 are both turned off. In other words, when the output voltage of the current conversion unit 30 is greater than or equal to a predetermined value, the starter circuit 20 stops.

The transistors Q1 and Q2 are both turned off during a normal operation. Specifically, since the internal power supply voltage Vcc is sufficiently high, the voltage Vn becomes sufficiently high (voltage Vn>Voltage Vref1), the output of the comparator CMP become high and the voltage Ve becomes sufficiently high. As a result, the base currents of the transistors Q1 and Q2 do not flow and the collector currents of the transistors Q1 and Q2 do not flow.

The configuration of a two-wire transmitter starter circuit which is similar to that in FIG. 4, is described in Japanese Unexamined Patent Application, First Publication No. 2006-174236.

According to the circuit configuration illustrated in FIG. 4, a constant current source I1 operating even when the internal power supply voltage Vcc has not yet launched need to be prepared. Therefore, the circuit configuration illustrated in FIG. 4 is complicated.

SUMMARY OF THE INVENTION

An aspect of the present invention provides a two-wire transmitter starter circuit including a simplified circuit configuration and a two-wire transmitter including the two-wire transmitter starter circuit.

In one aspect of the invention, a two-wire transmitter starter circuit may be configured to stably supply power at the time of start-up. The two-wire transmitter starter circuit may include a starter current generation circuit. The starter current generation circuit may be connected in parallel with a current conversion unit configured to convert a detection signal of a sensor to a predetermined DC current. The starter current generation circuit may include a first series circuit where a first resistor and a shunt regulator are connected in series, and a second series circuit where a switching element and a second resistor are connected in series. The shunt regulator may include a first control terminal connected to a connection point of the switching element and the second resistor. The switching element may include a second control terminal connected to a connection point of the first resistor and the shunt regulator.

In the two-wire transmitter starter circuit as described above, the switching element may be a field effect transistor.

In the two-wire transmitter starter circuit as described above, the switching element may be a junction transistor.

In the two-wire transmitter starter circuit as described above, the first series circuit and the second series circuit are connected in series may be connected in parallel to each other.

In the two-wire transmitter starter circuit as described above, the shunt regulator may be configured to control the second control terminal to apply across the second resistor the same voltage as a reference voltage in the shunt regulator.

In another aspect of the invention, a two-wire transmitter may include a two-wire transmitter starter circuit configured to stably supply power at the time of start-up and a current conversion unit configured to convert a detection signal of a sensor to a predetermined DC current. The two-wire transmitter starter circuit may include a starter current generation circuit. The starter current generation circuit and the current conversion unit may be connected in parallel to each other. The starter current generation circuit may include a first series circuit where a first resistor and a shunt regulator are connected in series, and a second series circuit where a switching element and a second resistor are connected in series. The shunt regulator may include a first control terminal connected to a connection point of the switching element and the second resistor. The switching element may include a second control terminal connected to a connection point of the first resistor and the shunt regulator.

In the two-wire transmitter as described above, the switching element may be a field effect transistor.

In the two-wire transmitter as described above, the switching element may be a junction transistor.

In the two-wire transmitter as described above, the current conversion unit may include two transmission lines configuring a two-wire type transmission line. A third resistor may be connected to one of the two transmission lines. The third resistor may be configured to detect current flowing through the transmission line.

In the two-wire transmitter as described above, the first series circuit and the second series circuit are connected in series may be connected in parallel to each other.

In the two-wire transmitter as described above, the shunt regulator may be configured to control the second control terminal to apply across the second resistor the same voltage as a reference voltage in the shunt regulator.

According to an aspect of the present invention, the constant current source operating before a power supply starts up is unnecessary, and the circuit configuration of the two-wire transmitter starter circuit can be simplified.

DETAILED DESCRIPTION OF THE INVENTION

Figure 1:
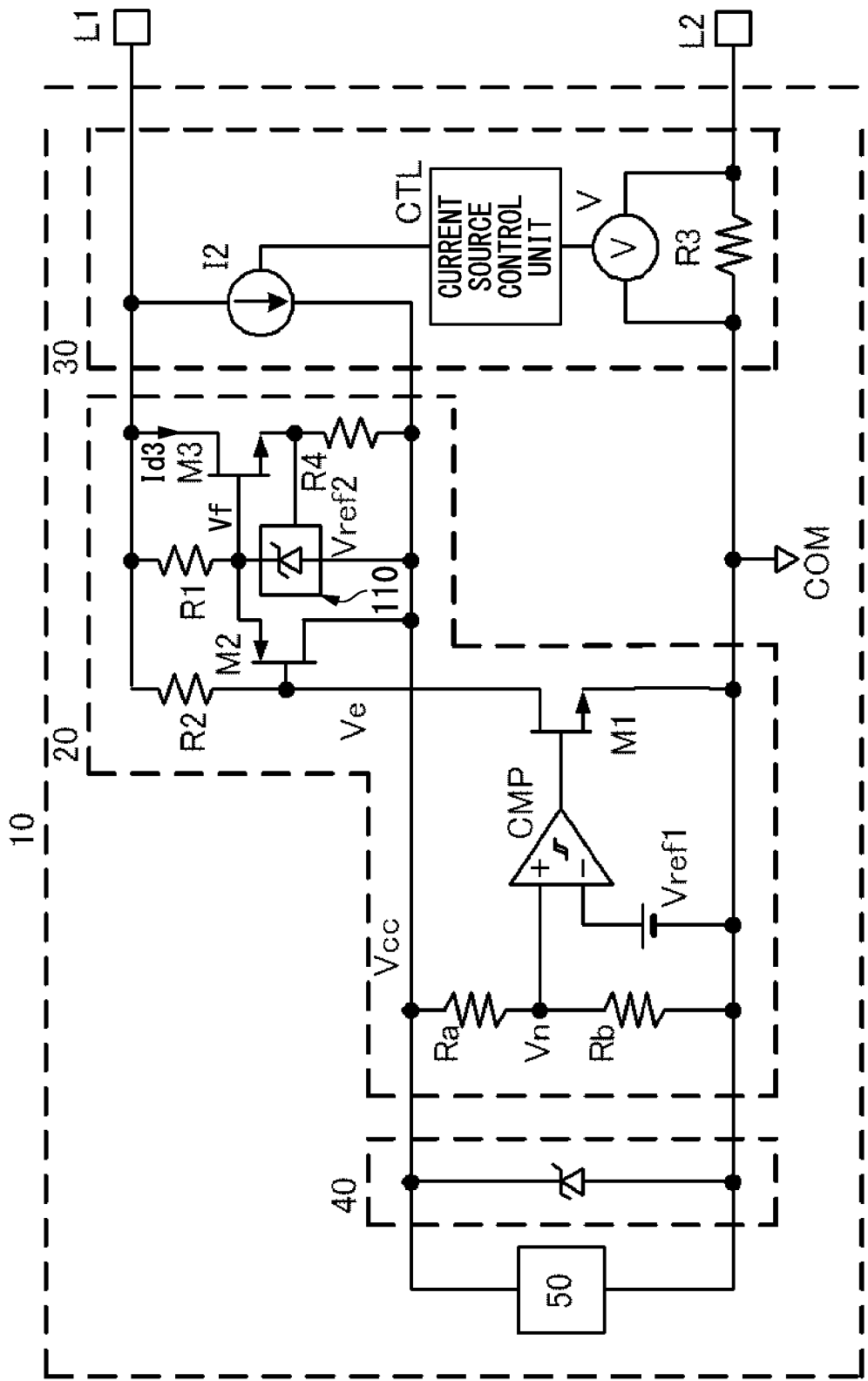
FIG. 1 is a block diagram illustrating an embodiment of the present invention.
Figure 4:
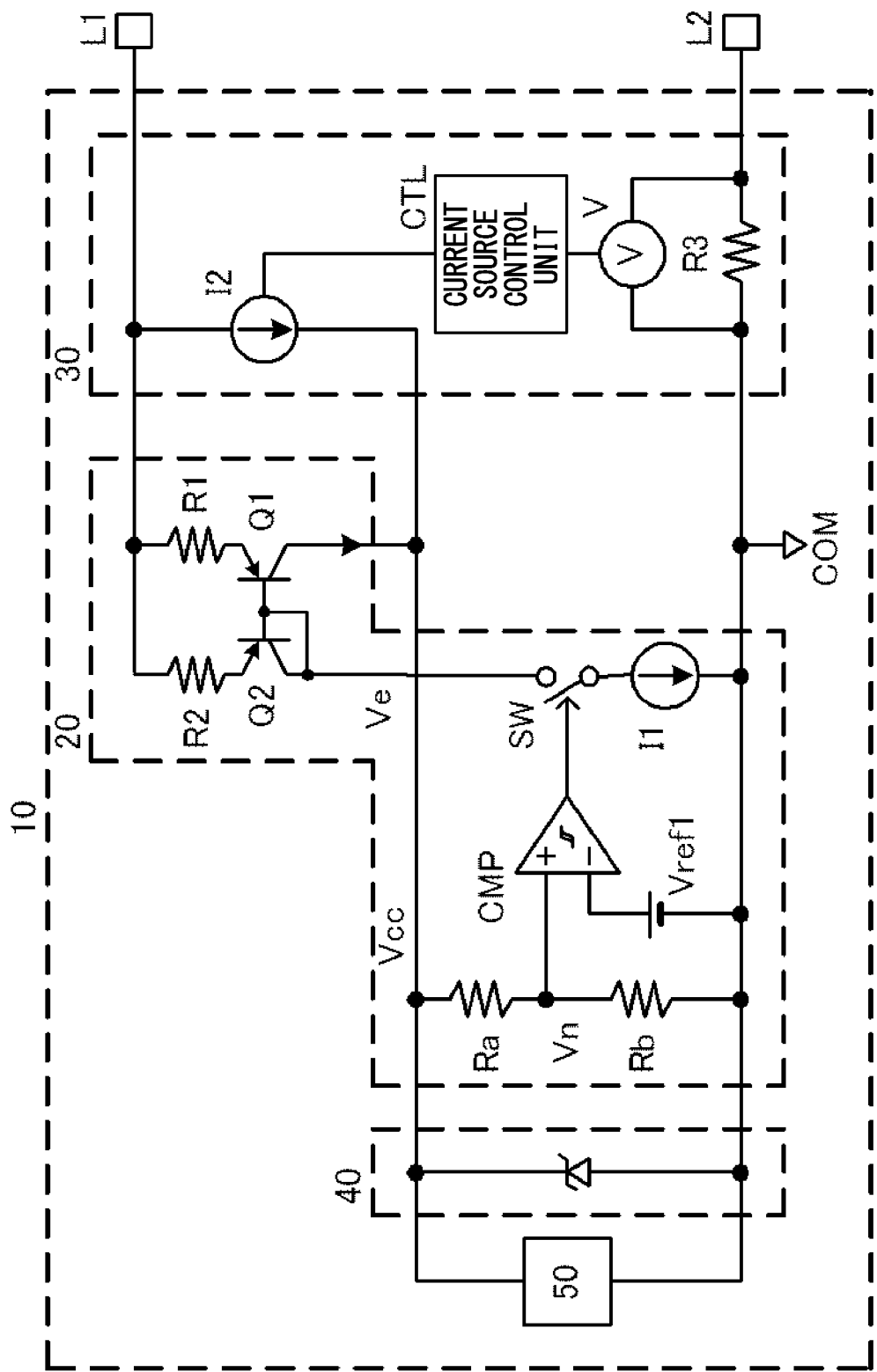
FIG. 4 is a circuit diagram illustrating an example of a two-wire transmitter starter circuit in the related art.

Hereinafter, one aspect of the present invention will be described with reference to the drawings. FIG. 1 is a block diagram illustrating an embodiment of the present invention, and the same parts as those in FIG. 4 are denoted by the same reference numerals. A two-wire transmitter 10 of the embodiment includes a starter circuit 20, a current conversion unit 30, a power supply unit 40, and an internal circuit 50. The starter circuit 20 is configured to secure supply of power and to improve stability of the transmitter 10 at the time of start-up. The current conversion unit 30 is configured to convert a detection signal of a sensor to a DC current ranging from 4 to 20 mA. The power supply unit 40 is configured to generate a predetermined voltage, and to supply the voltage to the current conversion unit 30, the internal circuit 50 and the like. The internal circuit 50 is configured to perform signal processing on an electrical signal from the sensor, and to send the signal to the current conversion unit 30.

FIG. 1 and FIG. 4 differ in the configuration of a starter current generation circuit provided in the starter circuit 20. The starter current generation circuit includes a resistor R1, a shunt regulator 110 configured as an integrated circuit, a field effect transistor M3 used as a switching element, and a resistor R4.

In general, "a shunt regulator" means a circuit or a component which has two terminals and is configured to keep a voltage constant between the two terminals. For example, a universal shunt regulator 100 illustrated in FIG. 5 includes a current source 200 connected between a terminal 101 and a terminal 102, and a control circuit 300. The shunt regulator 100 is configured to increase a current value of the current source 200 if the voltage between the terminal 101 and the terminal 102 is higher than a target voltage, and to decrease the current value of the current source 200 if the voltage between the terminal 101 and the terminal 102 is lower than the target voltage.

Figure 5:
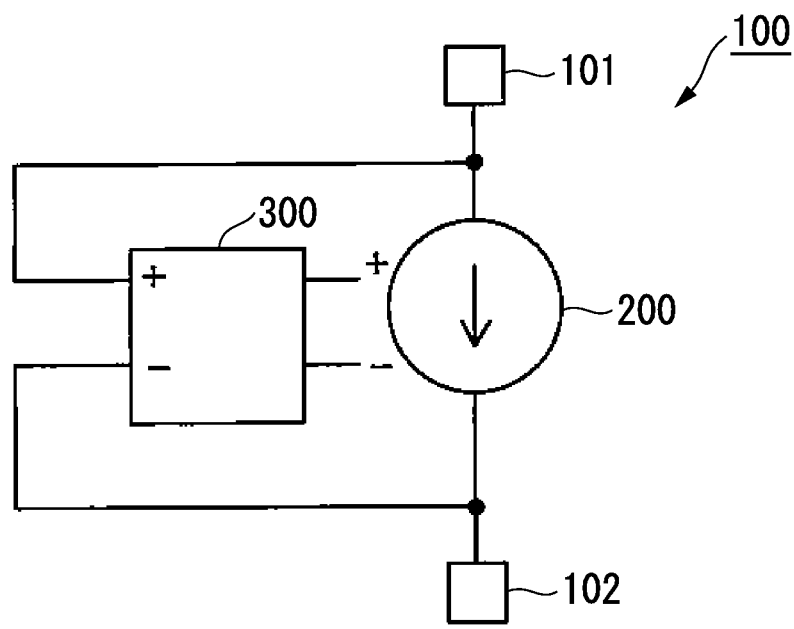
FIG. 5 is a diagram illustrating a universal shunt regulator.
Figure 6:
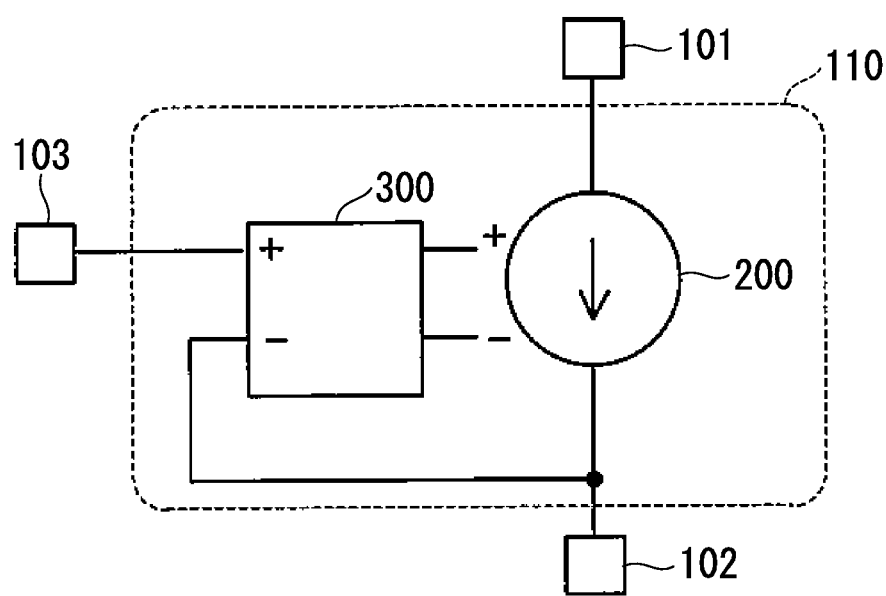
FIG. 6 is a diagram illustrating a shunt regulator used in an embodiment of the present invention.

In contrast, the shunt regulator 110 used in the embodiment of the present invention has a configuration that an input terminal of the control circuit 300 illustrated in FIG. 5 is connectable with the outside of the shunt regulator. As illustrated in FIG. 6, the shunt regulator 110 used in the embodiment of the present invention includes an input terminal of the control circuit 300 connected with a terminal 103 located in the outside of the shunt regulator 110. In the embodiment of the present invention, a shunt regulator which is fabricated for the sake of keeping a voltage constant is used to configure a constant current source.

In the starter circuit 20 illustrated in FIG. 1, the shunt regulator 110 is connected in series with the resistor R1, and a serial circuit of the resistor R1 and the shunt regulator 110 is connected in parallel with the current conversion unit 30. A serial circuit of the field effect transistor M3 and the resistor R4 is connected in parallel with the serial circuit of the resistor R1 and the shunt regulator 110. A drain of the field effect transistor M3 is connected to one terminal of the current conversion unit 30, a gate of the field effect transistor M3 is connected to a connection point of the resistor R1 and the shunt regulator 110, and a source of the field effect transistor M3 is connected to a control terminal of the shunt regulator 110.

Further, a field effect transistor M2 is connected in parallel with the shunt regulator 110, and a gate of the field effect transistor M2 is connected to a connection point of a field effect transistor M1 and a resistor R2 in a serial circuit of the field effect transistor M1 and the resistor R2. One terminal of the resistor R2 in the serial circuit of the field effect transistor M1 and the resistor R2 is connected to one terminal of the current conversion unit 30, and a source of the field effect transistor M1 is connected to the common potential COM. A gate of the field effect transistor M1 is connected to an output terminal of a comparator CMP.

Figure 7:
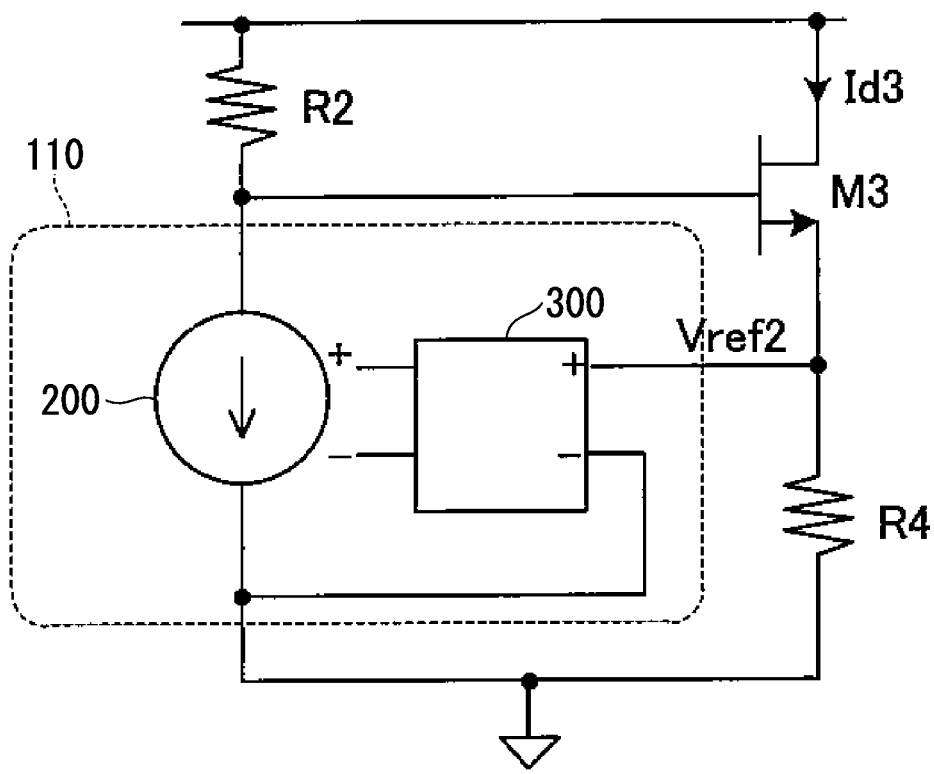
FIG. 7 is a diagram illustrating a usage of the shunt regulator used in the embodiment of the present invention.

In the embodiment of the present invention, as illustrated in FIG. 7, the constant current source includes the shunt regulator 110, the resistor R2, the resistor R4, and the field effect transistor M3. The constant current source is configured to keep a drain current Id3 constant. The shunt regulator 110 is configured to increase the current value of the current source 200 if an input of the control circuit 300 is higher than a target voltage and to decrease the current value of the current source 200 if the input of the control circuit 300 is lower than the target voltage. Therefore, the constant current source keeps a voltage applied across the resistor R4 constant by using the shunt regulator 110 as a part of the current source. As a result, the drain current Id3 of the field effect transistor M3 is kept at a constant value. In the configuration described above, the shunt regulator 110 is configured to control the gate of the field effect transistor M3 so that a voltage applied across the resistor R4 is the same voltage as a reference voltage source Vref2 in the shunt regulator 110. As a result, the drain current Id3 of the field effect transistor M3 functioning as a starter current is Id3=Vref2/R4.

A serial circuit of a resistor Ra and a resistor Rb is connected between a power supply line Vcc and the common potential COM. A non-inversion input terminal of the comparator CMP is connected to a connection point of the resistor Ra and the resistor Rb, and an inversion input terminal of the comparator CMP is connected to a reference voltage source Vref1. An output signal of the comparator CMP turns the field effect transistor M1 functioning as a switching element on or off.

The current conversion unit 30 is configured to convert a detection signal of a sensor, which is not illustrated, to a DC current ranging from 4 to 20 mA, and includes a current source I2 having one terminal connected to a transmission line L1 and the other terminal connected to the power supply line Vcc, a resistor R3 connected in series with a transmission line L2, a voltage measurement unit V configured to measure a voltage applied across the resistor R3, and a current source control unit CTL configured to control the current source I2 so that an output current has a predetermined value based on a voltage measurement result of the voltage measurement unit V.

The power supply unit 40 is connected in parallel with the serial circuit of the resistor Ra and the resistor Rb. The power supply unit 40 includes, for example, a Zener diode ZD. An anode of this Zener diode ZD is connected to the common potential COM, and a cathode of the Zener diode ZD is connected to the power supply line Vcc. Further, the power supply unit 40 may include an error amplifier or the like in place of the Zener diode.

The internal circuit 50 includes, a sensor which is not illustrated and is configured to measure a physical amount such as a pressure or a temperature, a microprocessor which is not illustrated and is configured to perform predetermined signal processing on an output signal of the sensor, and the like. This internal circuit 50 is connected in parallel with the power supply unit 40 and is configured to be driven by an output voltage of the power supply unit 40.

Operations of the circuit illustrated in FIG. 1 will be described. An internal power supply voltage of the power supply line Vcc is Vcc, a voltage of the transmission line L2 is Va, a voltage of the transmission line L1 is Vb, a voltage of a connection point of the resistor R1, the shunt regulator 110, and the gate of the field effect transistor M3 is Vf, a voltage of a connection point of the field effect transistor M2, the field effect transistor M1, and the resistor R2 is Ve, and a voltage of a connection point of the resistor Ra, the resistor Rb and the non-inversion input terminal of the comparator CMP is Vn.

Before start-up, the field effect transistor M1 functioning as a switching element is off, and a current does not flow in the circuit.

Figure 8:
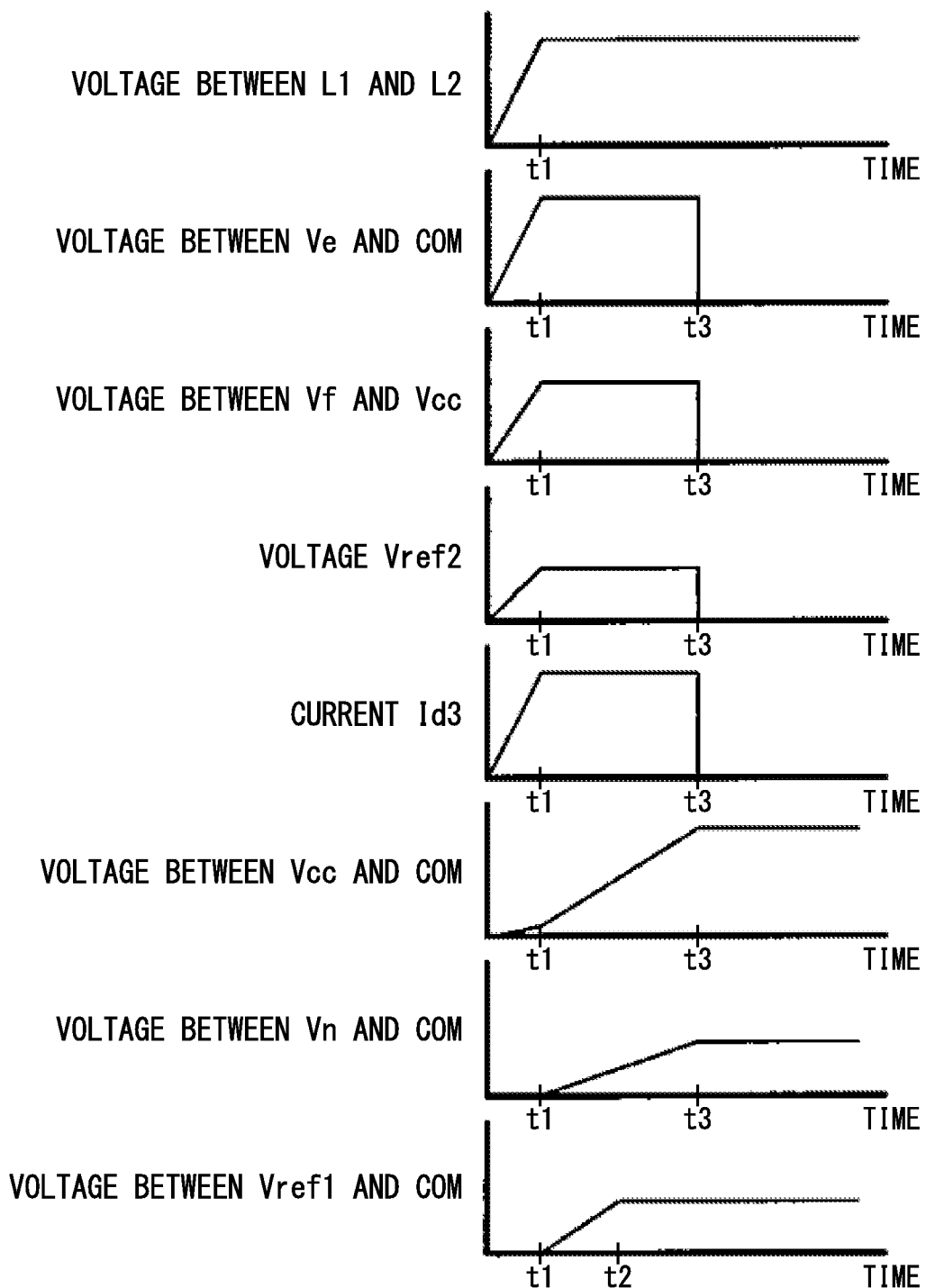
FIG. 8 is a graph illustrating a change of each voltage and current between nodes included in a circuit of FIG. 1 from the start-up of the circuit to the finish of the start-up operation.

At the time of start-up, the starter current generated by the starter current generation circuit rapidly launches the internal power supply voltage Vcc when a power is turned on. Hereinafter, operations of the circuit from the start-up of the circuit to the finish of the start-up operation will be described. In addition, a graph illustrating a change of each voltage and current between nodes included in the circuit from the start-up of the circuit to the finish of the start-up operation is illustrated in FIG. 8. At the time of start-up, a power supply voltage is applied between the transmission lines L1 and L2. The voltage between the transmission lines L1 and L2 reaches a constant value at time t1. This launches the drain current Id3. The drain current Id3 reaches a constant value at the time t1. The drain current Id3 increases a voltage between the power supply voltage Vcc and the common potential COM. In response to the increase of the voltage between the power supply voltage Vcc and the common potential COM, the voltage Vn into which the power supply voltage Vcc is divided and the reference voltage source Vref1 are also increased. The voltage between the reference voltage source Vref1 and the common potential COM reaches a constant value at time t2. The voltage between the power supply voltage Vcc and the common potential COM and the voltage between the voltage Vn and the common potential COM reache a constant value at time t3. When the voltage Vn becomes higher than the reference voltage source Vref1 (the voltage Vn>the voltage Vref1), the comparator CMP is inverted and the field effect transistor M1 is turned from off to on. At this time, the internal power supply voltage Vcc becomes a predetermined value or more (the voltage Vcc≥Vref1×Ra/Rb). As a result, a voltage between the voltage Ve and the common potential COM becomes zero. Moreover, an inverter including the field effect transistor M1 and the resistor R2 is inverted, the field effect transistor M2 is turned on, and a voltage between the voltage Vf and the power supply voltage Vcc becomes zero. When the voltage between the voltage Vf and the power supply voltage Vcc becomes zero, the shunt regulator 110 stops and the drain current Id3 and the reference voltage source Vref2 in the shunt regulator 110 also become zero. At this time, the operations of start-up finish.

The field effect transistor M3 is turned off during a normal operation. Therefore, the drain current Id3 of the field effect transistor M3 functioning as the starter current does not flow. The current source control unit CTL continues to provide the current from the current source I2 to the power supply voltage Vcc. The internal circuit 50 including a sensor, a microprocessor and the like is configured to operate by using the current from the current source I2. Since the current provided from the current source I2 is larger than the consumption current of the internal circuit 50, the power supply unit 40 keeps the power supply voltage Vcc constant.

In the circuit in the related art illustrated in FIG. 4, it was necessary to prepare the constant current source I1 operating even when the internal power supply voltage Vcc has not yet launched, while in the embodiment of the present invention illustrated in FIG. 1, such the constant current source I1 is unnecessary and the starter circuit can be configured more easily.

Figure 2:
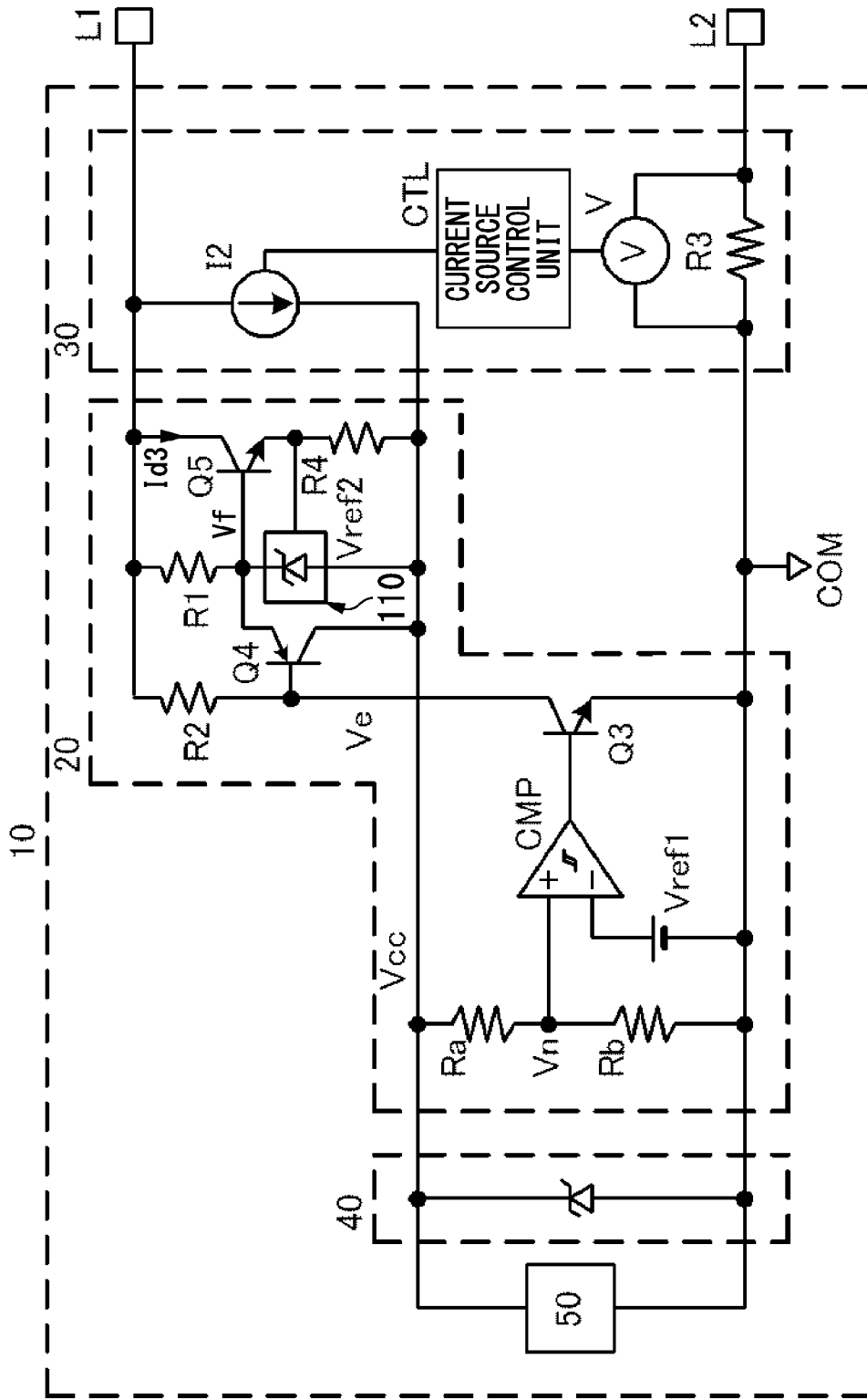
FIG. 2 is a block diagram illustrating another embodiment of the present invention.

In the embodiment illustrated in FIG. 1, the field effect transistors M1 to M3 are used as switching elements. At least one of the field effect transistors M1 to M3 may be replaced with bipolar junction transistors Q3 to Q5 as illustrated in FIG. 2. In the example illustrated in FIG. 2, a collector of the bipolar junction transistors Q3 is connected to the resistor R2, an emitter of the bipolar junction transistors Q3 is connected to the common potential COM, and a base of the bipolar junction transistors Q3 is connected to the output terminal of the comparator CMP. The bipolar junction transistors Q4 is connected in parallel with the shunt regulator 110, a base of the bipolar junction transistors Q4 is connected to a connection point of the bipolar junction transistors Q3 and the resistor R2 in a serial circuit of the bipolar junction transistors Q3 and the resistor R2. A collector of the bipolar junction transistors Q5 is connected to one terminal of the current conversion unit 30, a base of the bipolar junction transistors Q5 is connected to a connection point of the resistor R1 and the shunt regulator 110, and an emitter of the bipolar junction transistors Q5 is connected to the control terminal of the shunt regulator 110.

Figure 3:
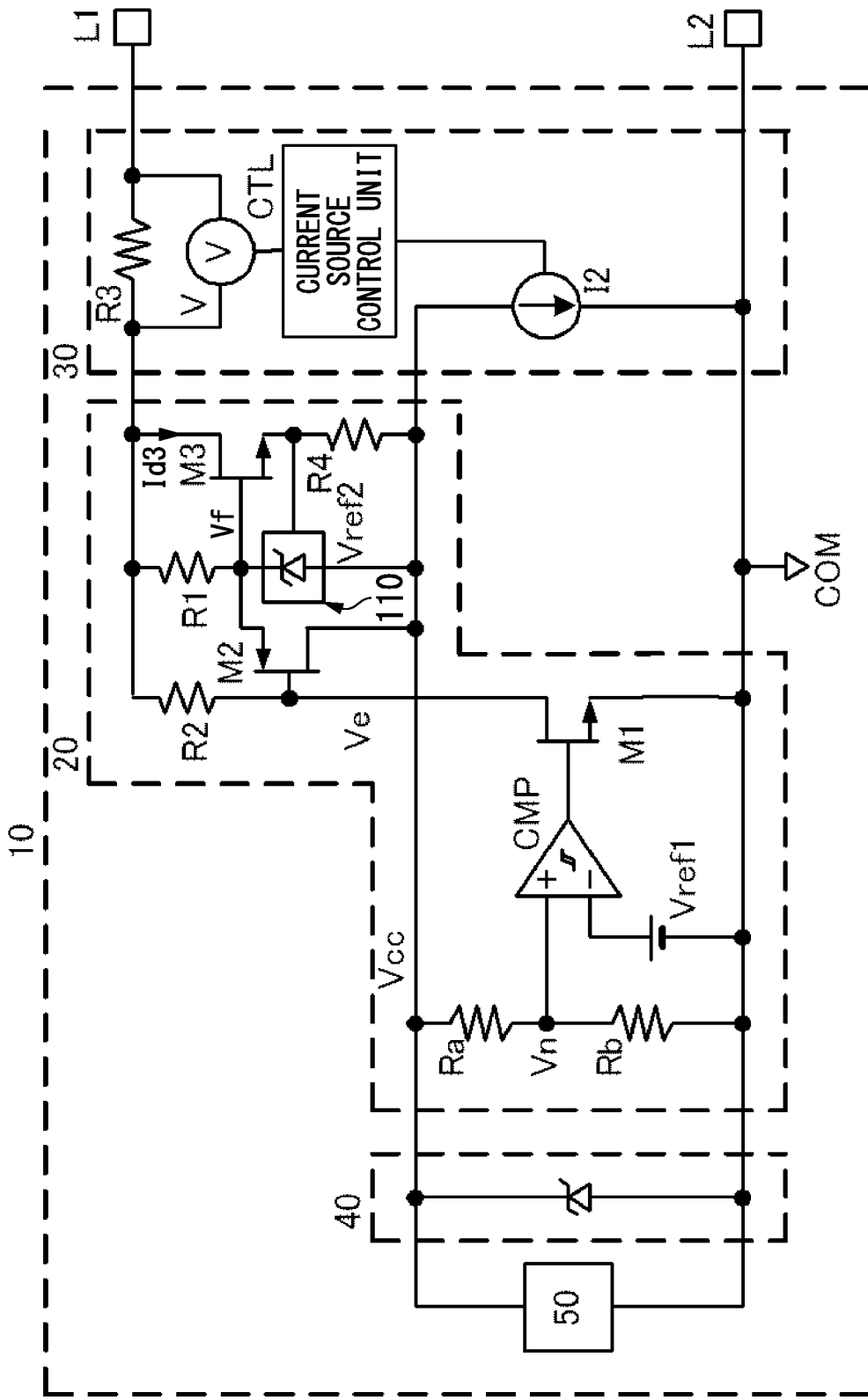
FIG. 3 is a block diagram illustrating another embodiment of the present invention.

Further, in the embodiments illustrated in FIGS. 1 and 2, the resistor R3 for detecting the current flowing through one transmission line L2 among the two-wire type transmission lines L1 connected in series with the transmission line L2. The resistor R3 for detecting the current flowing through the other transmission line L1 may be connected in series with the other transmission line L1, as illustrated in FIG. 3. In the example illustrated in FIG. 3, the current conversion unit 30 includes the current source I2 having one terminal connected to the transmission line L2 and the other terminal connected to the power supply line Vcc, the resistor R3 connected in series with the transmission line L1, the voltage measurement unit V configured to measure a voltage applied across the resistor R3, and the current source control unit CTL configured to control the current source I2 so that an output current has a predetermined value based on a voltage measurement result of the voltage measurement unit V.

As described above, according to an aspect of the present invention, the two-wire transmitter starter circuit having a simplified circuit configuration in which the constant current source operating before the power supply starts up is unnecessary, is provided.

Herein, the term "connect" means not only a case that components to be connected are directly connected each other, but also a case that components to be connected are indirectly connected each other.

What is claimed is:

1. A two-wire transmitter starter circuit which is configured to stably supply power at the time of start-up, the two-wire transmitter starter circuit comprising a starter current generation circuit, the starter current generation circuit being connected in parallel with a current conversion unit configured to convert a detection signal of a sensor to a predetermined DC current,
    wherein the starter current generation circuit comprises a first series circuit where a first resistor and a shunt regulator are connected in series, and a second series circuit where a switching element and a second resistor are connected in series,
    wherein the shunt regulator comprises a first control terminal connected to a connection point of the switching element and the second resistor, and
    wherein the switching element comprises a second control terminal connected to a connection point of the first resistor and the shunt regulator.

2. The two-wire transmitter starter circuit according to claim 1, wherein the switching element is a field effect transistor.

3. The two-wire transmitter starter circuit according to claim 1, wherein the switching element is a junction transistor.

4. The two-wire transmitter starter circuit according to claim 1, wherein the first series circuit and the second series circuit are connected in parallel to each other.

5. The two-wire transmitter starter circuit according to claim 1, wherein the shunt regulator is configured to control the second control terminal to apply across the second resistor the same voltage as a reference voltage in the shunt regulator.

6. A two-wire transmitter comprising:
    a two-wire transmitter starter circuit configured to stably supply power at the time of start-up, the two-wire transmitter starter circuit comprising a starter current generation circuit; and
    a current conversion unit configured to convert a detection signal of a sensor to a predetermined DC current,
    wherein the starter current generation circuit and the current conversion unit are connected in parallel to each other,
    wherein the starter current generation circuit comprises a first series circuit where a first resistor and a shunt regulator are connected in series, and a second series circuit where a switching element and a second resistor are connected in series,
    wherein the shunt regulator comprises a first control terminal connected to a connection point of the switching element and the second resistor, and
    wherein the switching element comprises a second control terminal connected to a connection point of the first resistor and the shunt regulator.

7. The two-wire transmitter according to claim 6, wherein the switching element is a field effect transistor.

8. The two-wire transmitter according to claim 6, wherein the switching element is a junction transistor.

9. The two-wire transmitter according to claim 6,
    wherein the current conversion unit comprises two transmission lines configuring a two-wire type transmission line, and
    wherein a third resistor is connected to one of the two transmission lines, and the third resistor is configured to detect current flowing through the transmission line.

10. The two-wire transmitter according to claim 6, wherein the first series circuit and the second series circuit are connected in parallel to each other.

11. The two-wire transmitter according to claim 6, wherein the shunt regulator is configured to control the second control terminal to apply across the second resistor the same voltage as a reference voltage in the shunt regulator.

* * * * *